US009897481B2

United States Patent
Maeda

(10) Patent No.: US 9,897,481 B2
(45) Date of Patent: Feb. 20, 2018

(54) LASER POWER SENSOR

(71) Applicant: FANUC CORPORATION, Yamanashi (JP)

(72) Inventor: Michinori Maeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/343,802

(22) Filed: Nov. 4, 2016

(65) Prior Publication Data

US 2017/0138787 A1    May 18, 2017

(30) Foreign Application Priority Data

Nov. 13, 2015 (JP) ................... 2015-223222

(51) Int. Cl.

| | |
|---|---|
| *G01J 5/02* | (2006.01) |
| *G01J 1/42* | (2006.01) |
| *G01J 1/02* | (2006.01) |
| *G01J 1/04* | (2006.01) |

(52) U.S. Cl.
CPC ........... *G01J 1/4257* (2013.01); *G01J 1/0252* (2013.01); *G01J 1/0418* (2013.01)

(58) Field of Classification Search
CPC .... G02F 1/0121; G03F 7/70058; G03F 7/701; G03F 7/70358; G03F 7/70558; G02N 21/9045; G02N 2033/0081
See application file for complete search history.

(56) References Cited

U.S. PATENT DOCUMENTS

| | | | | |
|---|---|---|---|---|
| 4,378,490 A | * | 3/1983 | d'Auria | .......... G02F 1/0121 250/201.1 |
| 5,678,924 A | | 10/1997 | Naquin et al. | |
| 6,011,612 A | * | 1/2000 | Go | .......... G03F 7/70058 250/341.4 |

FOREIGN PATENT DOCUMENTS

| | | |
|---|---|---|
| JP | 59025436 U1 | 2/1984 |
| JP | 60220302 A | 11/1985 |
| JP | 07-181078 A | 7/1995 |
| JP | 2677845 B | 11/1997 |
| JP | 2005-091271 A | 4/2005 |
| JP | 2006170729 A | 6/2006 |
| JP | 2008224242 A | 9/2008 |
| JP | 2010-212552 A | 9/2010 |

* cited by examiner

*Primary Examiner* — Kiho Kim
(74) *Attorney, Agent, or Firm* — RatnerPrestia

(57) ABSTRACT

A low-cost laser power sensor having sufficient measurement accuracy with respect to received light intensity of the power sensor. The power sensor has a sensor substrate which receives monitor light, and a filter which attenuates the intensity of the laser beam before being received by the sensor substrate. The filter is constituted from a material having a laser transmissivity equal to zero, and has a plurality of openings within an irradiation range where the monitor light is irradiated. A summation of opening areas of the openings is equal to or more than 50% of the irradiation range. A part of the laser beam, which is irradiated to the filter and passes through the openings, is directly received by the sensor substrate.

10 Claims, 2 Drawing Sheets

INTENSITY DISTRIBUTION OF LASER BEAM

LASER POWER SENSOR

BACKGROUND OF THE INVENTION

1. Field of the Invention

The present invention relates to a laser power sensor for measuring an intensity of a laser beam.

2. Description of the Related Art

In a near-infrared laser device such as a carbon dioxide laser, a power sensor for measuring an actual laser power is often used, in order to control the laser power. For example, a thermoelectric power sensor is configured to receive monitor light of from several watts to several tens of watts extracted from a rear mirror of a resonator, and measure laser power by converting the received light to a voltage signal. Such a power sensor has a substrate (or a thermal disc) constituted from a high thermal conductive material, and a thermocouple positioned around a portion of the substrate (or a light-receiving portion) by which the monitor light is directly received, wherein a voltage is generated due to a difference between the temperature of the light-receiving portion and the ambient temperature.

When the above power sensor is used for a high-power laser device, the temperature of the substrate (thermal disc) is excessively increased as the intensity of the monitor light from the rear mirror is increased. In such a case, the function of the power sensor may be deteriorated as a result of damage to the light-receiving portion or the thermocouple. Therefore, it is necessary to design the power sensor based on the intensity of the monitor light from the rear mirror.

As a relevant prior art document, JP 2005-091271 A discloses a laser power monitor including: a light-receiving part for converting energy of an incident laser beam to heat; a heat-releasing part adjacent to the light-receiving part and for releasing the heat converted by the light-receiving part; and a temperature detecting part for measuring the temperature of the light-receiving part, wherein a measuring range of the temperature detecting part is wider than a beam diameter of the laser beam of a portion of the light-receiving part which does not contact the heat-releasing part, whereby the temperature can be measured in a non-contact manner.

JP 2010-212552 A discloses a laser oscillator including a diffuse-absorber for darkening a laser beam, a laser power detector for detecting the darkened laser beam, and a chamber-type limiting means for limiting an amount of incident light toward the laser power detector, whereby measurement accuracy of the laser power detector may be improved and the laser power can be stably controlled.

JP H07-181078 A discloses an attenuator for a laser power sensor, including: an introducing part for introducing a laser beam; an attenuating part having a cylindrical member connected to the introducing part and having a reflective surface formed on an inner surface of the cylindrical member for reflecting the laser beam; and a target plate having multiple pyramids or cones in a grid pattern with a pitch smaller than a diameter of the laser beam, the target plate being adhered to the attenuator so that the irradiated laser beam is divided by being reflected by surfaces of the pyramids or the cones and directed toward the inner surface.

Further, JP 2677845 B discloses a laser power measurement device including an integrating sphere having multiple holes formed on an incident part thereof so as to transmit a laser beam, and an output detecting sensor arranged at an appropriate portion of the integrating sphere for detecting an output of the laser beam.

In the prior art, in order to prevent a light-receiving part, etc., from being damaged by heat, the following two general options may be used.

(1) Depending on an increase in the intensity of a laser beam, a heat capacity of the light-receiving part (thermal disc) is increased (for example, the plate thickness or the diameter is increased), or a cooling capacity of the light-receiving part is increased, so as to limit an increase in the temperature of the light-receiving part.

(2) A laser absorber such as a filter or an integrating sphere is positioned in front of the light-receiving part, so as to limit the intensity of the laser beam toward the light-receiving part.

Regarding option (1), when the heat capacity of the light-receiving part is increased, a temperature rise speed thereof is decreased, and thus a response speed of an output voltage of the thermocouple relative to the incident laser beam, which is an important parameter of the power sensor, may be decreased. On the other hand, when the cooling capacity of the light-receiving part is improved by forced-air-cooling or water-cooling, the size and cost of the power sensor are inevitably increased. In addition, it is difficult to control the improved cooling capacity, and therefore, when the cooling capacity is not appropriately controlled, the temperature measurement by the thermocouple may be affected, whereby the laser power may not be correctly measured and may not be appropriately controlled.

Regarding option (2), as a method or means for decreasing the intensity of the incident laser beam, a half mirror or an ND (neutral density) filter may be used. However, such means is a precise and expensive optical component, and it is necessary to carry out maintenance (e.g., cleaning and replacement) in order to ensure the reliability of the power sensor for a long time. Accordingly, the cost of the power sensor is significantly increased. Further, the means for reducing the intensity of the laser beam by reflection or diffusion, such as an integrating sphere, includes many components and is expensive, and requires a large location space, and thus the laser oscillator may be enlarged.

SUMMARY OF THE INVENTION

An object of the present invention is to provide a low-cost laser power sensor having sufficient measurement accuracy with respect to a received light intensity of the power sensor, more concretely, a laser power sensor having a means for decreasing the intensity of the incident laser beam without using an expensive optical component for absorbing or dividing the laser beam or an element for diffusing the laser beam.

Accordingly, the invention provides a laser power sensor comprising: a light-receiving member which receives a laser beam; and a light intensity attenuating member which attenuates an intensity of the laser beam before being received by the light-receiving member, wherein the light intensity attenuating member is constituted from a material, a laser transmissivity of which is zero, the light intensity attenuating member has a plurality of openings, and a summation of opening areas of the plurality of openings is equal to or more than 50% of an irradiation range of the light intensity attenuating member where the laser beam is irradiated, and wherein the light-receiving member is configured to receive a part of the laser beam after passing through the openings of the light intensity attenuating member.

In a preferred embodiment, each of the plurality of openings has the same shape and size as each other, and the plurality of openings are positioned at regular intervals within an irradiation range of the laser beam.

Alternatively, each of the plurality of openings may have the same shape and size as each other, and the plurality of openings may be radially positioned within an irradiation range of the laser beam.

In a preferred embodiment, each of the plurality of openings has a rectangular or square shape.

In a preferred embodiment, a minimum distance between neighboring openings of the plurality of openings corresponds to a half of a thickness of the light intensity attenuating member.

In a preferred embodiment, absorptance of the material of the light intensity attenuating member is higher than reflectance of the material of the light intensity attenuating member.

In a preferred embodiment, the material of the light intensity attenuating member is an oxygen-free copper processed by black nickel plating or black chromium treatment.

In a preferred embodiment, the light intensity attenuating member is detachably attached to a spacer positioned on the light-receiving member or between the light-receiving member and the light intensity attenuating member.

In a preferred embodiment, the laser power sensor further comprises a cooling part positioned along an outer periphery of the light-receiving member or the light intensity attenuating member. The cooling part may be configured to simultaneously cool both the light-receiving member and the light intensity attenuating member.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
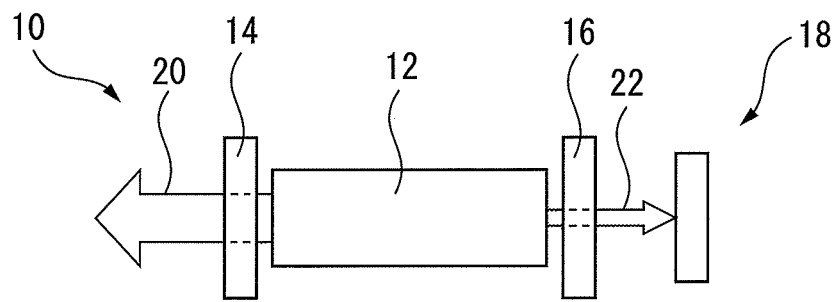
FIG. 1 is a schematic view showing a laser power sensor according to a preferred embodiment of the present invention, and a laser device including the laser power sensor.

FIG. 1 is a schematic view showing a laser power sensor (hereinafter, merely referred to as a power sensor) according to a preferred embodiment of the present invention, and a laser device including the laser power sensor. For example, laser device 10 is a carbon dioxide laser (or a near-infrared laser device) using carbon dioxide gas as laser medium, and has a discharge tube 12 containing medium such as carbon dioxide gas, an output mirror 14 positioned at one end of discharge tube 12, and a rear mirror 16 positioned at the other end of discharge tube, wherein a laser resonator is constituted by the mirrors and discharge tube 12. Further, laser device 10 has a power sensor 18 positioned opposed to discharge tube 12 with respect to rear mirror 16.

When electrical power is supplied to discharge tube 12, the medium within discharge tube 12 is excited by discharging so as to generate a light. This light is repeatedly reflected between output mirror 14 and rear mirror 16, and is amplified by induced emission. Then, a part of the amplified light is extracted from output mirror 14 (i.e., the half mirror) as a laser beam 20, and is used for laser processing, etc.

In the embodiment of FIG. 1, rear mirror 16 is also a half mirror, and a part of the laser beam after transmitting through rear mirror 16 (monitor light 22) is received and measured by poser sensor 18. A measurement result of an output of monitor light 22 is used to control (e.g., feedback control) the laser beam output from output mirror 14. In the embodiment of FIG. 1, power sensor 18 is positioned at the back side of rear mirror 18. Alternatively, rear mirror 16 may be a total reflection mirror, and a part of the laser beam output from output mirror 14 may be extracted by using another half mirror (not shown), and then the extracted light may be received and measured by power sensor 18 as the monitor light.

Figure 2:
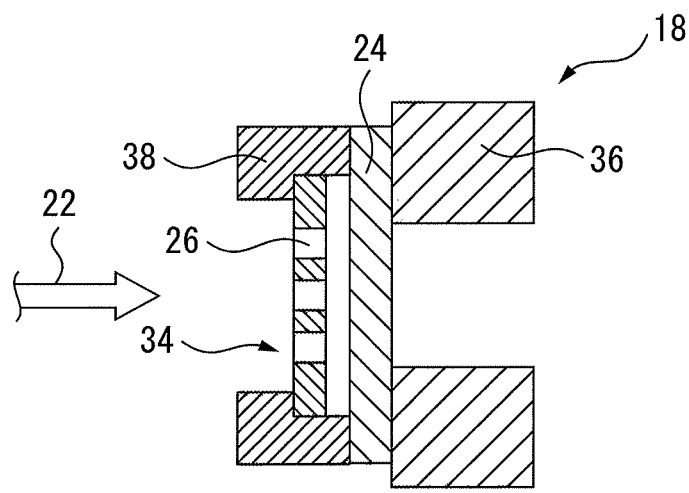
FIG. 2 shows a schematic configuration of the laser power sensor of FIG. 1.
Figure 3:
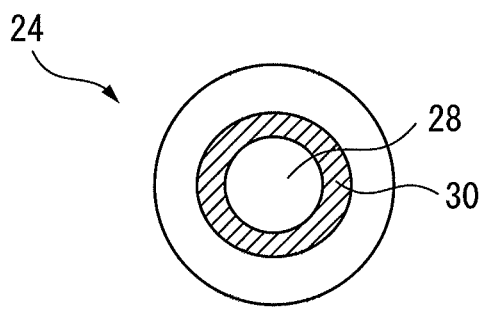
FIG. 3 is a schematic plan view of a sensor substrate of the laser power sensor of FIG. 2.

FIG. 2 is a sectional view along with a laser beam axis, showing a schematic configuration of power sensor 18. Power sensor 18 has a light-receiving member (or a sensor substrate) 24, such as a thermal disc, which receives monitor light 22, and a light intensity attenuating member (or a filter) 26 which attenuates the intensity of the laser beam (or the monitor light) before being received by sensor substrate 24. Filter 26 is constituted from a (light-impermeable) material having a laser transmissivity equal to zero, and has a plurality of openings 34 so that a part of monitor light 22 passes therethrough. As shown in FIG. 3 showing a schematic plan view of sensor substrate 24, sensor substrate 24 has a light-receiving part (surface) 28 which directly receives the monitor light attenuated by filter 26 (after passing through the openings of filter 26), and a thermocouple 30 positioned on an outer periphery of light-receiving part 28. Thermocouple 30 is configured to generate a voltage due to a difference between the temperature of light-receiving part 28 and the ambient temperature of light-receiving part 28 (i.e., convert the intensity of the monitor light into an electrical signal). In this regard, sensor substrate 24 may be conventional, as exemplified in FIG. 5 of JP 2005-091271 A.

Figure 4:
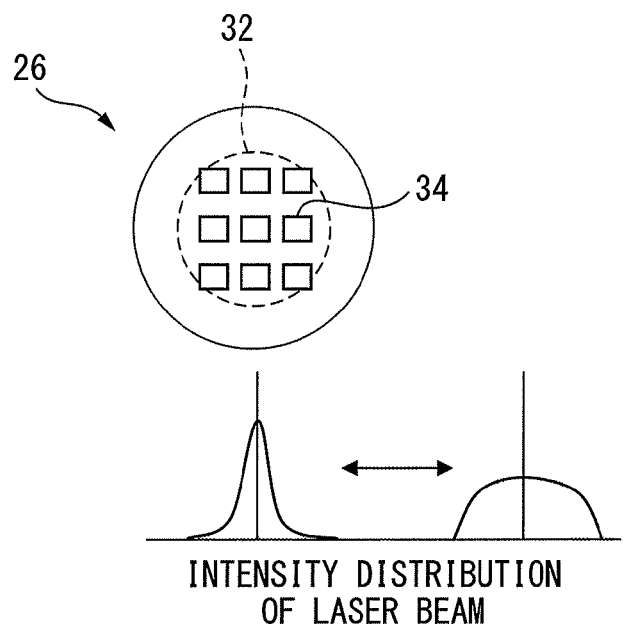
FIG. 4 shows a filter of the laser power sensor of FIG. 2, and a change in an intensity distribution of a laser beam.

FIG. 4 is a plan view of filter 26 as shown in FIG. 2, along with a change in an intensity distribution of a laser beam. Filter 26 has a plurality of through openings 34 positioned within an irradiation range 32 of filter 26 where the laser beam is irradiated, and a summation of opening areas of openings 34 is equal to or more than 50% of an area of irradiation range 32. In other words, a part of the laser beam, which is irradiated to filter 26 and passes through openings 34, is directly received by (light-receiving part 28 of) sensor substrate 24.

Figure 5:
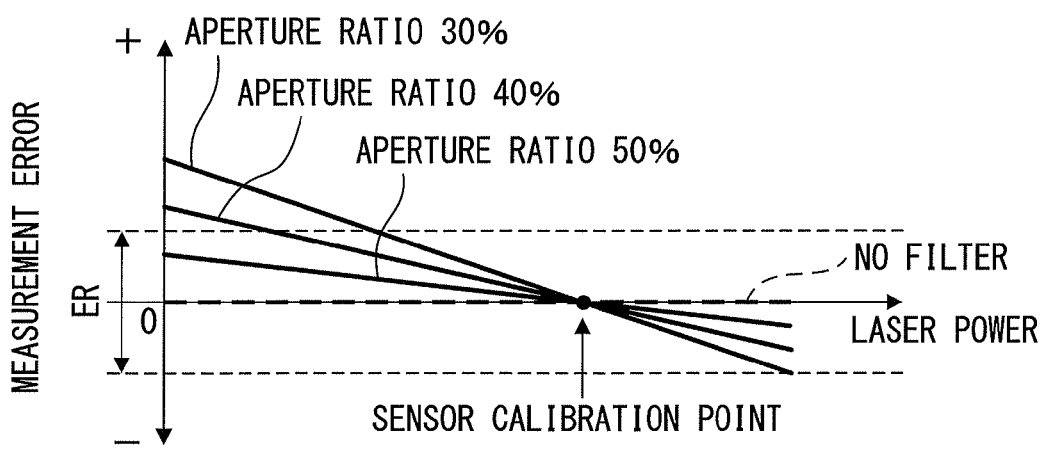
FIG. 5 shows a graph in which a relationship between a measurement error due to thermal expansion and an aperture ratio in the laser power sensor.

Next, a relationship between thermal expansion of the filter and a measurement error will be explained. In general, a power sensor having a light-receiving member and a thermocouple, such as power sensor 18 as shown in FIG. 2, has high linearity of measurement. Therefore, when the poser sensor is calibrated by using a rate output of the laser oscillator, sufficient measurement accuracy can be obtained within a possible output range. In this regard, when filter 26 for absorbing a part of the laser beam is used, the opening area of the filter is varied depending on its thermal expansion, whereby the measurement accuracy of the power sensor is decreased. FIG. 5 is a graph showing an experimental relationship between a measurement error due to the thermal expansion and an opening (aperture) ratio. As shown in FIG. 5, in order that the measurement error due to the thermal expansion be within an error range ER (e.g., ±2%) having no problem in practical use, it is experimentally confirmed that it is sufficient the aperture ratio is 50% or more.

As a method for manufacturing filter 26, a conventional sheet-metal processing (such as a punching, a laser processing, a water-jet processing or an electro-discharge machining) or an etching may be used. In particular, a high-accuracy processing can be carried out by the etching. Further, the etching can form a thin line having a width corresponding to approximately a half (50%) of the plate thickness at the minimum, and thus the etching can form filter 26 having a mesh (thin lines) with a high aperture ration, so that a minimum distance between openings 34 corresponds to the half of the thickness of filter 26.

It is preferable that absorptance of a material constituting filter 26 be higher than reflectance of the material. By virtue of this, the laser device can be constituted while being less affected by the reflection light. Further, it is preferable that the material of filter 26 have high laser absorptance, high thermal conductivity, and a low thermal expansion coefficient. An example of the material having such characteristics is a ceramic-base material, however, the ceramic-base material is costly and workability thereof is low. In this regard, when an oxygen-free copper (having high thermal conductivity) is processed by black nickel plating or black chromium treatment (the black nickel or black chromium has high absorptance of laser beam), a filter material having high absorptance and thermal conductivity can be obtained.

As explained above, in power sensor 18 according the preferred embodiment of the present invention, plate-like filter 26, constituted from the material capable of absorbing the laser beam and having plurality of openings 34, is positioned at the front side of light-receiving part (thermal disc) 28, whereby a part of monitor light 22 reaches light receiving part 28. As shown in FIG. 4, in general, an intensity distribution of a laser beam is not uniform within an irradiation area thereof, and further, the intensity distribution is varied with time. Therefore, when only a part of the laser beam is measured, it is difficult to precisely estimate or measure the total laser intensity. In addition, the filter after absorbing the laser beam may be expanded due to heat generation so that the aperture ratio is changed, whereby the measurement error of the power sensor may be increased. In this regard, in power sensor 18, as shown in FIG. 4, plurality of openings 34 are formed on filter 26, and a summation of opening areas of openings 34 is equal to or more than 50% of the irradiation area where the laser beam is irradiated. By virtue of this, the effect on the measurement accuracy due to the intensity distribution or the temporal change therein can be reduced, and the measurement error can be reduced by limiting the thermal expansion of the filter.

Although the shape of each opening 34 is a quadrangle (such as a square or rectangle) in FIG. 4, the shape thereof is not limited as such, for example, may be a circle or ellipse. Although openings 34 are positioned at regular intervals (so as to form a grid-shape) in FIG. 4, openings 34 may be radially positioned with respect to the center of filter 26, and the distance between each opening may not be constant. Further, although it is preferable that each opening have the same shape and the same dimension from a quality control perspective, at least one of the shape, the dimension and the interval between the openings may be partially different within the irradiation range, depending on the intensity distribution of the laser beam.

Further, depending on a temporal change in the intensity distribution of the irradiated laser beam, the number of the openings may be arbitrarily determined. For example, in a laser oscillator in which a laser beam is stable so that the intensity distribution thereof is not substantially changed, the number of openings may be relatively small. On the other hand, in a laser oscillator in which the intensity distribution is significantly varied, the number of openings may be relatively large, whereby the effect on the measurement of laser power due to the change in intensity distribution can be reduced.

In power sensor 18, the intensity of the laser beam is measured by converting the laser beam received by sensor substrate 24 into heat. Therefore, in many cases, it is necessary to cool sensor substrate 24 by a cooling unit (or a cooling part) 36, such as an air-cooled heatsink or a water jacket having a generally annular shape, positioned on the surface of sensor substrate 24 and along an outer periphery of thermocouple 30. In this regard, it is preferable that the center (of gravity) of filter 26 and the center of the laser beam (or the monitor light) be coaxially arranged.

In power sensor 18, the part of the laser beam is received by filter 26, and thus also filter 26 is desired to be cooled. In order to cool filter 26, another cooling unit separated from cooling part 36 may be used. However, in terms of cost and space, it is preferable that cooling part 36 also cool filter 26 as well as sensor substrate 24. In this regard, filter 26 and light-receiving part 28 (or sensor substrate 24) may be fastened to each other. However, in terms of productivity, it is preferable that a spacer 38 having high thermal conductivity, such as a metal, be positioned between filter 26 and sensor substrate 24, so that spacer 38, filter 26 and sensor substrate 24 are fixed to each other, as shown in FIG. 2. By virtue of this, sensor substrate 24 and filter 26 can be simultaneously cooled by substantially one cooling unit, whereby the space and the cost of power sensor 18 can be saved without deteriorating the function thereof.

In the example of FIG. 2, sensor substrate 24 is cooled by cooling part 36 directly attached to the back side of sensor substrate 24, and filter 26 is cooled by heat conduction via spacer 38 having generally the annular shape. Alternatively, cooling part 36 may be directly attached to the outer periphery of filter 26, and/or cooling part 36 may be directly attached to spacer 38.

It is preferable that filter 26 be detachably attached to sensor substrate 24 (or spacer 38) so that the filter can be replaced with another filter having different specifications. By changing the specification of the filter (or exchanging the filter), several types of power sensors having different measurement ranges can be easily manufactured by using the same sensor substrate including the thermocouple. Therefore, a power sensor, capable of measuring the wide range of laser beam intensities (i.e., capable of being used for a high-power laser), can be provided at a low cost.

According to the laser power sensor of the present invention, the power of the incident laser beam toward the sensor substrate can be attenuated while maintaining sufficient measurement accuracy, whereby a life of the power sensor can be lengthened and a cost of the power sensor can be reduced.

By arranging the openings so that each opening has the same shape and the same size, and so that the openings are positioned at regular intervals or radially positioned within the irradiation range of the laser beam, the laser power can be precisely measured even when the intensity distribution of the laser beam is varied.

By forming each opening as the quadrangle, the aperture ratio of the filter can be higher than when each opening has the circle shape, whereby an attenuation rate can be lowered. Further, by using etching, etc., the distance between neighboring openings of the plurality of openings may be equal to or less than a half of the thickness of the light intensity attenuating member. By virtue of this, a fine mesh having a large aperture ratio can be formed, and the attenuation ratio and the measurement error can be reduced.

By using the material having high absorptance of the laser beam, as the material of the light intensity attenuating member, the reflection of the laser beam is limited in the power sensor. In this regard, an oxygen-free copper processed by black nickel plating or black chromium treatment has high absorptance of the laser beam and high thermal conductivity. Therefore, by using the oxygen-free copper processed by black nickel plating or black chromium treatment as the material of the light intensity attenuating member, the power sensor having the larger aperture ratio can be obtained, in which the change in the measurement accuracy is small.

By arranging the cooling part positioned along the outer periphery of the light-receiving member or the light intensity attenuating member, the power sensor may be compact. Further, by configuring substantially one cooling unit so as to simultaneously cool the light-receiving member and the light intensity attenuating member, the space and the cost of the power sensor can be significantly saved.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser power sensor comprising:
   a light-receiving member which receives a laser beam; and
   a light intensity attenuating member which attenuates an intensity of the laser beam before being received by the light-receiving member,
   wherein the light intensity attenuating member is constituted from a material, a laser transmissivity of which is zero, the light intensity attenuating member has a plurality of openings, and a summation of opening areas of the plurality of openings is equal to or more than 50% of an irradiation range of the light intensity attenuating member where the laser beam is irradiated, and wherein the light-receiving member is configured to receive a part of the laser beam after passing through the openings of the light intensity attenuating member.

2. The laser power sensor as set forth in claim 1, wherein each of the plurality of openings has the same shape and size as each other, and the plurality of openings are positioned at regular intervals within an irradiation range of the laser beam.

3. The laser power sensor as set forth in claim 1, wherein each of the plurality of openings has the same shape and size as each other, and the plurality of openings are radially positioned within an irradiation range of the laser beam.

4. The laser power sensor as set forth in claim 1, wherein each of the plurality of openings has a rectangular or square shape.

5. The laser power sensor as set forth in claim 1, wherein a minimum distance between neighboring openings of the plurality of openings corresponds to a half of a thickness of the light intensity attenuating member.

6. The laser power sensor as set forth in claim 1, wherein absorptance of the material of the light intensity attenuating member is higher than reflectance of the material of the light intensity attenuating member.

7. The laser power sensor as set forth in claim 1, wherein the material of the light intensity attenuating member is an oxygen-free copper processed by black nickel plating or black chromium treatment.

8. The laser power sensor as set forth in claim. 1, wherein the light intensity attenuating member is detachably attached to a spacer positioned on the light-receiving member or between the light-receiving member and the light intensity attenuating member.

9. The laser power sensor as set forth in claim 1, further comprising a cooling part positioned along an outer periphery of the light-receiving member or the light intensity attenuating member.

10. The laser power sensor as set forth in claim 9, wherein the cooling part is configured to simultaneously cool both the light-receiving member and the light intensity attenuating member.

* * * * *